United States Patent [19]
Homma et al.

[11] Patent Number: 5,383,111
[45] Date of Patent: Jan. 17, 1995

[54] VISUAL MERCHANDIZING (VMD) CONTROL METHOD AND SYSTEM

[75] Inventors: Koichi Homma, Yokohama; Akira Kagami, Kawasaki; Tadashi Tenma, Sagamihara; Kichizo Akashi, Ebina; Tetsuo Kusuzaki, Kawasaki; Tatsumi Nishimoto, Ayase; Hiroaki Oyama, Yokohama, all of Japan

[73] Assignee: Hitachi, Ltd., Tokyo, Japan

[21] Appl. No.: 593,955

[22] Filed: Oct. 9, 1990

[30] Foreign Application Priority Data

Oct. 6, 1989 [JP] Japan .................. 1-260023
Mar. 15, 1990 [JP] Japan .................. 2-66482

[51] Int. Cl.⁶ .............................. G06F 15/24
[52] U.S. Cl. ....................... 364/401; 364/403; 235/385
[58] Field of Search ............ 364/400, 401, 403; 235/375, 383, 385

[56] References Cited

U.S. PATENT DOCUMENTS

| | | | |
|---|---|---|---|
| 4,509,123 | 4/1985 | Vereen | 364/403 |
| 4,775,935 | 10/1988 | Yourick | 364/401 |
| 4,812,985 | 3/1989 | Hambrick et al. | 364/403 |
| 4,920,488 | 4/1990 | Filley | 364/403 |
| 4,947,322 | 8/1990 | Tenma et al. | 364/401 |
| 4,972,318 | 11/1990 | Brown et al. | 364/401 |
| 4,992,940 | 2/1991 | Dworkin | 364/401 |
| 5,025,140 | 6/1991 | Varley | 364/403 |
| 5,053,956 | 10/1991 | Donald et al. | 364/401 |
| 5,111,392 | 5/1992 | Malin | 364/400 |

OTHER PUBLICATIONS

Hitachi Review, vol. 71, No. 2, pp. 67-72, (1989-2).
Nikkei Data Pro-Marketing System, Oct. 1988, MA-1-6500-006.

Primary Examiner—Robert A. Weinhardt
Attorney, Agent, or Firm—Fay, Sharpe, Beall, Fagan, Minnich & McKee

[57] ABSTRACT

A merchandising system for conducting a control of article display positions that are generally changed by the customers includes a method of obtaining article display positions based on the present display state. In this system, when selecting coordinate items to be suitably combined with an article, the display positions thereof can be easily determined, which advantageously helps the customer to search the store or floor for the desired items.

20 Claims, 19 Drawing Sheets

| 115 STORE CODE | 116 FIXTURE ID | 117 FIXTURE KIND | 118 CODE | 119 COORDINATES | 120 ARTICLE CODE SERIES |
|---|---|---|---|---|---|
| 101 | 1 | HANGER | 11 | $(x_1, y_1)$ | $a_1, a_2, ---, a_e$ |
| | | | 12 | $(x_2, y_2)$ | |
| | 2 | SHOWCASE | 21 | $(x_3, y_3)$ | $b_1, b_2, b_3, b_4, e, b_5-b_7, e, e$ |
| | | | 22 | $(x_4, y_4)$ | : |
| | 3 | BOX | 31 | $(x_5, y_5)$ | . |
| | | | 32 | $(x_6, y_6)$ | . |
| | | | 33 | $(x_7, y_7)$ | . |
| | n | | $n_1$ | $(x_n, y_n)$ | . |
| | | | $n_2$ | : | . |

| ARTICLE CODE | CENTER COORDINATES | COORDINATES 1 | COORDINATES 2 | COORDINATES 3 | COORDINATES 4 |
|---|---|---|---|---|---|
| $a_1$ | $(x_{a1}, y_{a1})$ | $(x_{a11}, y_{a11})$ | $(x_{a12}, y_{a12})$ | $(x_{a13}, y_{a13})$ | $(x_{a14}, y_{a14})$ |
| $a_2$ | $(x_{a2}, y_{a2})$ | $(x_{a21}, y_{a21})$ | $(x_{a22}, y_{a22})$ | $(x_{a23}, y_{a23})$ | $(x_{a24}, y_{a24})$ |
| $a_3$ | $(x_{a3}, y_{a3})$ | $(x_{a31}, y_{a31})$ | $(x_{a32}, y_{a32})$ | $(x_{a33}, y_{a33})$ | $(x_{a34}, y_{a34})$ |
| ⋮ | ⋮ | ⋮ | ⋮ | ⋮ | ⋮ |
| ⋮ | ⋮ | ⋮ | ⋮ | ⋮ | ⋮ |

70

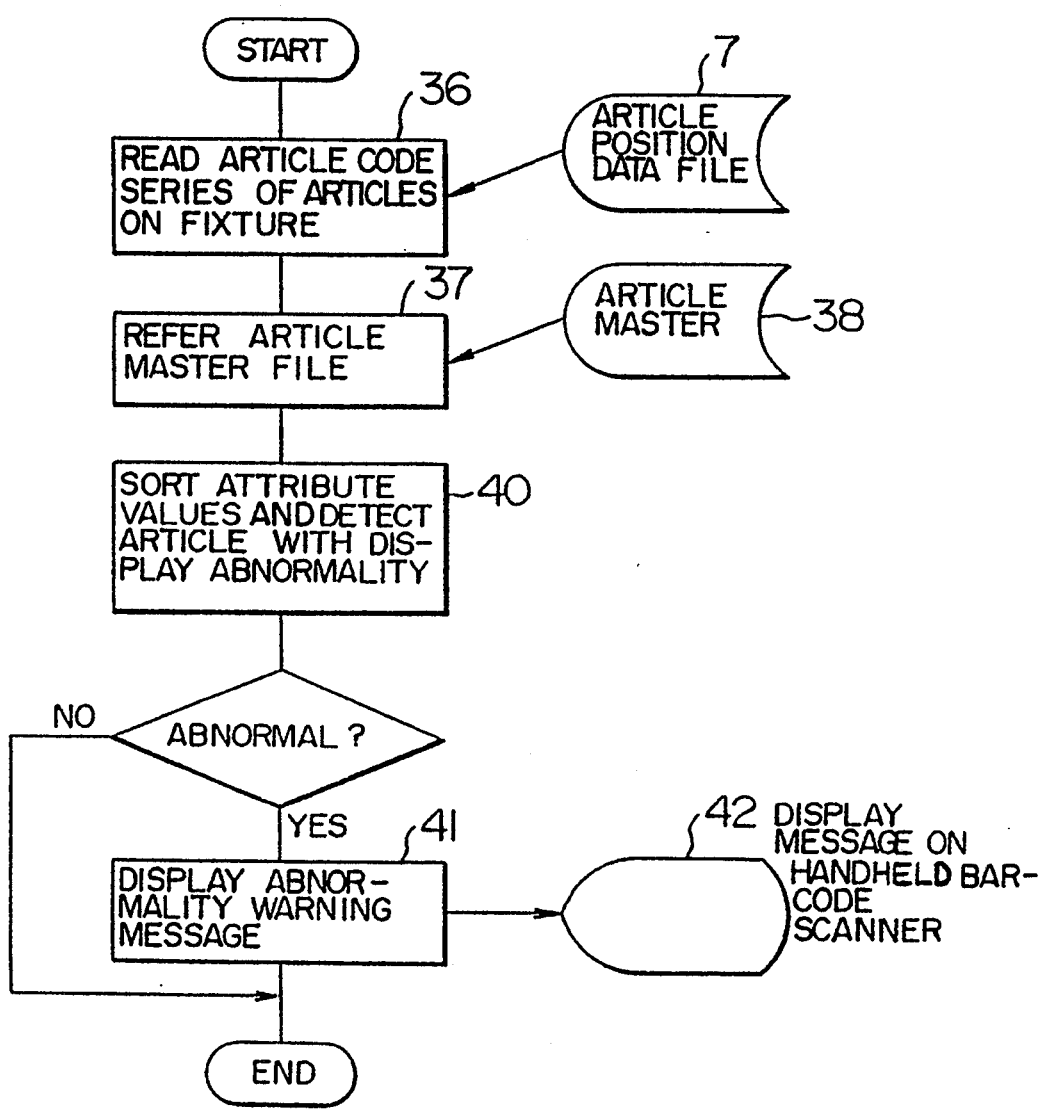

FIG. 11A
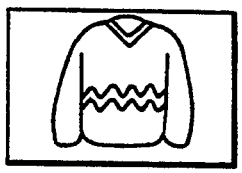
10123
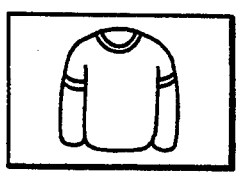
10112
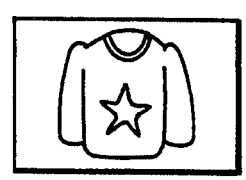
10301
FIG. 11B
| MERCHANDISE CODE | PATTERN IMAGE # | TEXTURE IMAGE # | COLOR CODE |
|---|---|---|---|
| 10123 | 1 | 1 | $C_1$ |
| 10112 | 2 | 4 | $C_2$ |
| 10301 | 10 | 2 | $C_4$ |
71
FIG. 11C
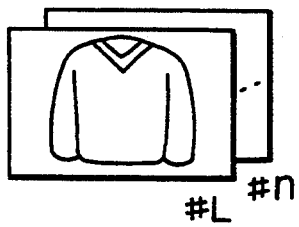
L  #n
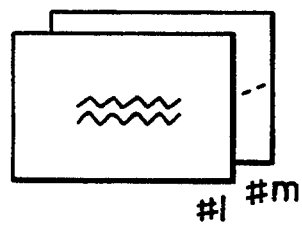
l  #m
FIG. 12A
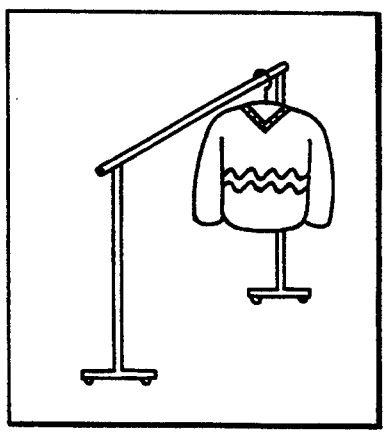
FIG. 12B
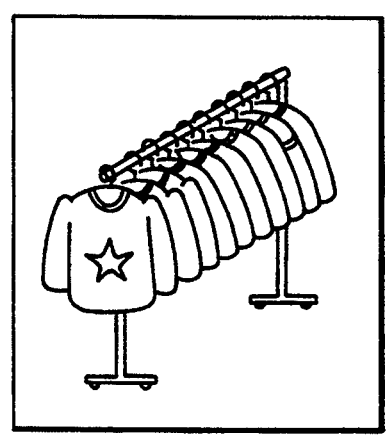

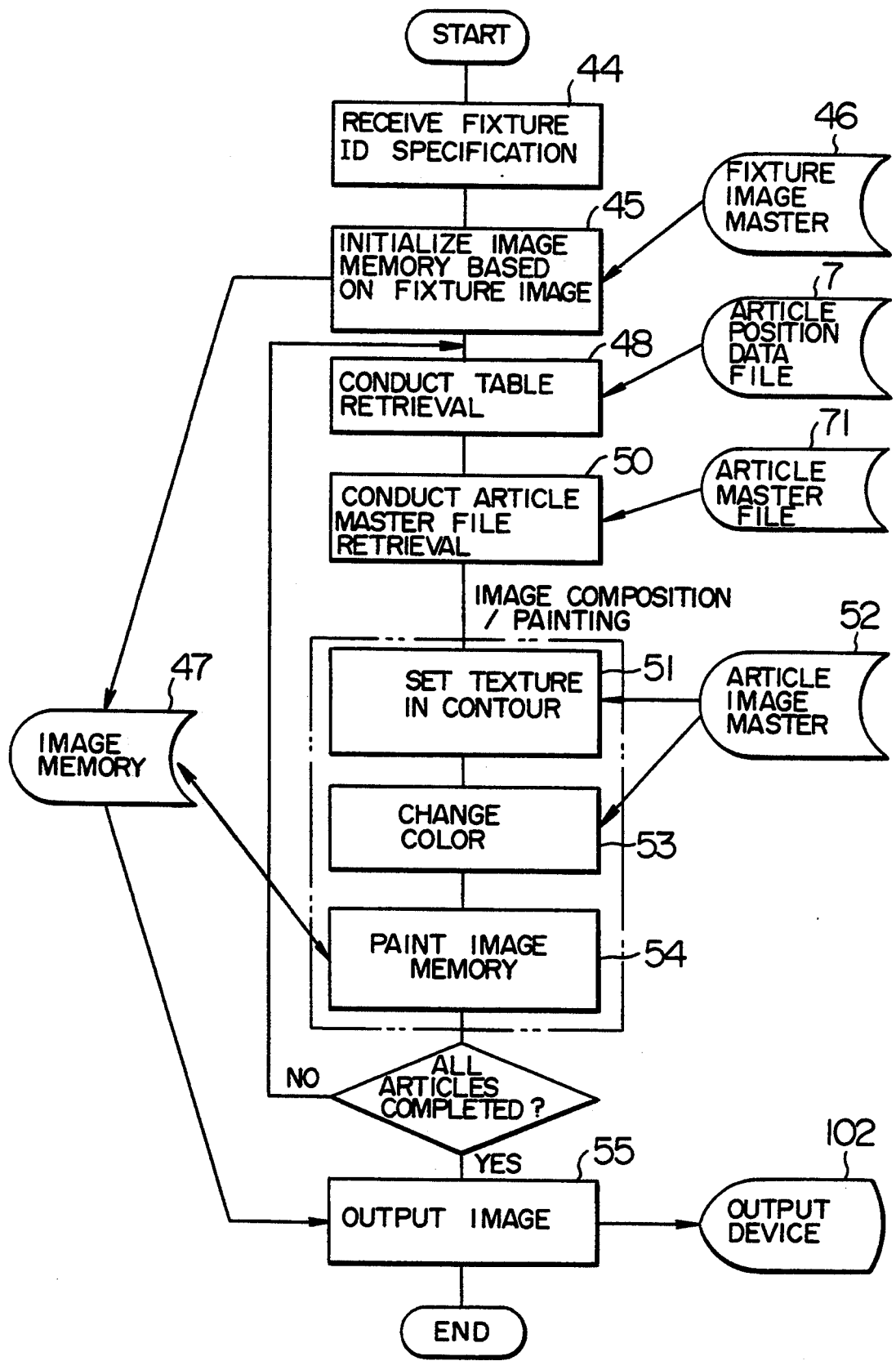

FIG. 19

| ATTRIBUTE DATA | | | | | 1727 |
|---|---|---|---|---|---|
| SEX, AGE | KIND | | SIZE | PRICE | ID CODE |
| FEMALE, MARRIED | SWEATER | | M | 5K~10K | 12345678 |
| . | . | | . | . | . |
| . | . | | . | . | . |
| . | . | | . | . | . |

FIG. 20

| | ID CODE OF KEY ARTICLE | USAGE PURPOSE | SENSE | RECOMMENDED COORDINATES | | | 1723 |
|---|---|---|---|---|---|---|---|
| | | | | HAT | TROUSERS | | |
| SWEATER FOR MARRIED LADY | 12345678 | PRIVATE | URBAN | 23456789 | 34567890 | 456789 | |
| | . | . | . | . | . | . | |
| | . | . | . | . | . | . | |
| | . | . | . | . | . | . | |

FIG. 21

| ID CODE | SALES POINT | | SALES POSITION CODE | STOCK |
|---|---|---|---|---|
| 123456789 | LATEST FASHION | | 2nd FLOOR -B-6 | YES |
| | | | | YES |
| | | | | NO |
| | | | | |

| CUSTOMER NO. | SEX | AGE | USAGE | SENSE | MATERIAL | | PRICE |
|---|---|---|---|---|---|---|---|
| 1 | FEMALE | | PRIVATE | URBAN | ALPACA | | 5K~10K |
| | MARRIED | | | | | | |
| | | | | | | | |

《AUTUMN-WINTER GOODS》

|  | 10 YEARS | 20 YEARS | 30 YEARS | 40 YEARS | 50 YEARS |
|---|---|---|---|---|---|
| MALE | | | | | |
| FEMALE | | | ▨ | | |
| UNISEX | | | | | |
|  | 2 YEARS | 4 YEARS | 6 YEARS | 8 YEARS | 10 YEARS |

1 — 2301

CHILDREN | RETURN | | | | | CONFIRMATION

| KIND | USAGE | SENSE |
|---|---|---|
| SWEATER | PRIVATE | URBAN |
| SKIRT | FORMAL | ORIGINAL |
| | | CONSERVATIVE |

2302

INITIAL | RETURN | ⇧ | ⇩ | | | CONFIRMATION

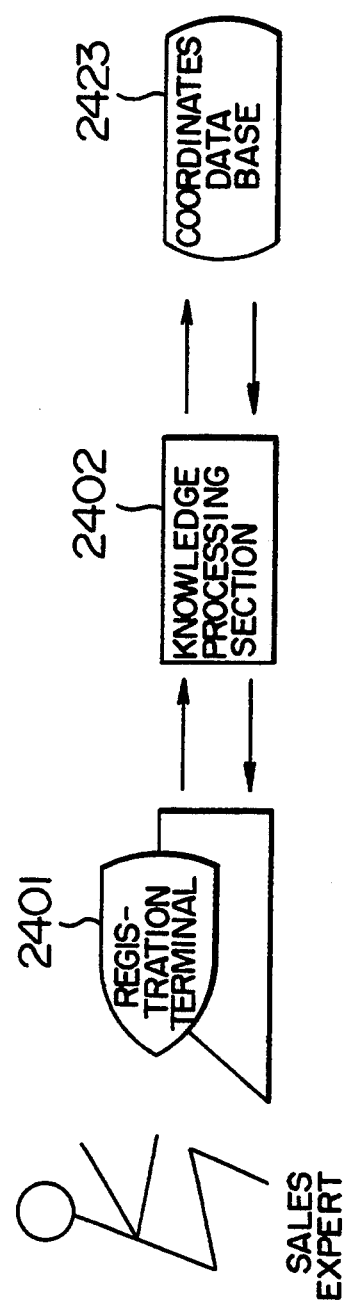

VISUAL MERCHANDIZING (VMD) CONTROL METHOD AND SYSTEM

BACKGROUND OF THE INVENTION

The present invention relates to an article or goods display control method, an article or goods guide method, and a system of the same suitable for obtaining merchandising information to control sales and stock amounts of articles in a store.

There has been known an information system for distribution industries called a planogram or a facing control expert system. This system helps make an article display plan and outputs on a display an image of an article display state (reference is to be made to pages 67 to 72 of Hitachi Hyoron, Vol. 71, No. 2 and to U.S. Pat. No. 4,947,322). In the conventional system, there is produced an image similar to a patchwork presenting various images of articles and goods respectively viewed from a front side thereof like an image of a front view of a display shelf of a supermarket. Moreover, this system is designed on the assumption that the articles are to be displayed or arranged at the respective predetermined positions on the display shelves. In consequence, information of positions beforehand assigned to the respective articles or items are inputted to a computer system so as to generate an article display image based on the display positions.

An example of an article guide system using information outputted from an article display control system of this type is as follows.

As a conventional article guide system aiming at helping a sales job in a store or shop handling dresses and ornaments or accessories associated therewith, there has been known, for example, an electronic dress check system called "Magic Mirror" described in Hightech Merchandising Method in the U.S. III. Merchandising In Store/Mall" (Nikkei data Pro-Marketing System, October 1988, MA1-600-006).

In this electronic dress check system, a customer first specifies a desired dress and an ornament therefor from a catalogue of dresses and ornaments. The store employee supplies the system with numbers respectively of the specified dress and accessory together with a body shape and a face contour of the customer. In response to these supplied items, the system generates and displays an image on which the specified dress and accessory are projected onto the contour of the body with the face of the customer.

Consequently, in this system, the customer need not actually try on the dress. Namely, based on the display image in which the customer seems to actually put the dress on, it is possible for the customer to check the dress for suitability before a decision is made for the purchase of the dress.

As a result, for the store side as well as for the customer, the period of time conventionally required to try on the dress and an ornament therefor can be dispensed with; namely, a time-saving effect is achieved.

SUMMARY OF THE INVENTION

The conventional technology above has been devised for an article display plan in a store on the assumption that items and goods are arranged for display based on predetermined positional information. Consequently, information about articles such as sales results need only be analyzed depending on the article positions specified when the display plan is determined. However, in a case such as a corner or section of dresses or other clothes in a store, for example, where (1) new products are daily supplied and (2) article display positions are changed on a daily basis or at any time when necessary in association with sales amounts and sales activities, the items are rarely kept arranged on shelves at the same positions according to the predetermined article display plan. In order to control the article display state and the state transition or change as well as to control the sales and stock amounts of the articles, it is essential to gather information about article display positions in association with the actual display state and its changes. In the prior art above, however, considerations have not been given to the collection of information about article display position. Namely, the conventional technology is not suitably applied to control the article display in a corner of a store, for example, where the article display positions are frequently altered.

The recognition of this problem to control article display positions for articles of which the display positions are often varied is a novel idea.

It is therefore an object of the present invention to provide an article display control method and a system using the same which facilitates the collection of information about article display positions and which is suitably applied to the control of article display positions.

In addition, in the electronic dress check system described above, the numbers assigned to a dress and its accessory are required to be inputted to the system. Namely, the user need concretely specify the dress and the accessory. However, the customer cannot specify a dress and an accessory in some cases. Particularly, there exists a case where, although a dress can be concretely specified, an accessory matching the dress cannot be specifically designated. In such a case, the customer asks the store employee for advice with respect to a fashion image such that the adviser selects, based on the fashion image and a contour of the customer, several specific candidates from an accessory catalog. The customer then decides a desired item from the candidates.

In this situation, however, the adviser of the store selects the accessory candidates depending on his or her own knowledge and opinions about articles. As a result, it is possible that an item desired by the customer cannot be appropriately selected and hence a sales chance is disadvantageously lost in some cases.

Furthermore, it is onerous for the customers to explain a fashion image and listen to advice or impressions from the sales person. Consequently, the system cannot be necessarily used as a help for the sales job.

Another object of the present invention is therefore to provide an article guide method and a system using the same in which an article desired by a customer is selected and is then presented to the customer; moreover, the customer does not feel any annoyance from the explanation about the fashion image and from an evaluation or impression given from the adviser.

Further, another object of the present invention is to provide an article guide method and a system using the same in which needs of the customers are also collected.

Other objects of the present invention will be apparent by reference to the following description and accompanying drawings.

The objects above can be achieved as follows. Namely, merchandise codes of articles to be displayed are read by means of a merchandise code reading apparatus in a predetermined order to input a series of merchandise codes thus obtained to a computer system. The computer system processes the information thus received in a predetermined sequence to obtain data of article display positions. Moreover, the computer system retrieves, in response to a specification of an article, a merchandising control information data base to obtain a coordinate item to be combined with the article so as to output information of the coordinate item obtained depending on the article display position data.

Furthermore, the objects above can be achieved by use of an article display control system comprising a computer system including a merchandise code reading apparatus for reading merchandise codes of articles to be displayed or arranged; and an output apparatus for obtaining article positional information from a series of the obtained merchandise codes and a predetermined merchandise code read sequence, and for obtaining merchandise information from the article positional information so as to output the resultant merchandising information.

In this connection, the merchandise code reading apparatus can read, in addition to the merchandise code, codes associated with a code system similar to the merchandise code system.

The objects above can be achieved as follows. First, an article is specified to retrieve an article data base by use of the specified article as a retrieval key to identify a coordinate item to be combined with the article, thereby presenting the coordinate item.

Moreover, the objects above can be achieved by obtaining data of customers' needs based on frequencies of specifications of respective articles or coordinate items.

In addition, the present invention provides an article guide system for accomplishing the article guide method.

Various kinds of fixtures are used to arrange articles. In a case of a line of hangers in a store handling clothes, the article display is conducted such that clothes are arranged on the hangers in a straight line. In such a case, when merchandise codes of the articles thus aligned are to be sequentially read beginning from an end of the line, the article position of each article on the hangers can be identified by use of a series of article codes. Moreover, with the provision of two kinds of fixture identification codes respectively fixed to the ends of the hangers, when these identification codes are read before and after an article code read operation on the line of hangers, the article position in the hangers can be identified regardless of the direction of the read operation. Furthermore, if the hangers are arranged at a known position in the store (in the store layout), namely, if each fixture identification is assigned with known coordinates of the store, a position of the associated article can be determined in the store.

A description has been given of the principle of decision of article positional data based on a merchandise code read operation by using hangers by way of example. This also applies to the following cases other than the case of hangers. For example, for articles arranged in a box or bunker in an accumulated manner or for articles disposed in a two-dimensional fashion in a showcase, the read operation sequence need only be beforehand determined, for example, such that the merchandise codes are sequentially read from the upper-most item to the lower-most item in the former case or from the rear column to the front column in which each column is subjected to the read operation from the left to the right in the latter case. Under the conditions above, the article positional data can be determined according to a similar principle described above. In the case of the articles arranged in a two-dimensional fashion, a code designating an end of column is favorably set to a position terminating each column.

In the computer system in which the article display or arrangement positions in fixtures are decided depending on a series of merchandise or article codes read by means of a merchandise code reader, the article display positions can be determined on the assumption that the articles are arranged with fixed intervals therebetween, which does not lead to any particular problem for the following reason. Namely, the number of articles to be accommodated in or on a fixture is limited due to the size of the fixture. Moreover, in general, for the control of the article display, accurate positions of articles on the fixture are not required to be obtained. For a fixture having a size which is remarkably large as compared with a size of an article to be arranged therein, a fixture identification code need only be designated for each group of articles (e.g. for each column when the articles are displayed in a plurality of columns or at each separation point when the articles are arranged in a long column), thereby assuming that a provisional fixture (a subdivided fixture) is assigned to the unit or group of articles associated with the fixture identification code.

In the article guide method and the system using the same in accordance with the present invention, when an article is specified, an article data base is retrieved by use of the article as a retrieval key to select and to present a coordinate item to be combined with the article.

Consequently, a coordinate item suitable for the specified article can be appropriately chosen to be presented to the customer. Moreover, the customer is relieved from the burden to explain a desired fashion image to the salesperson, and from the annoyance of listening to evaluations and impressions given by the salesperson.

Furthermore, in the article guide method and the system using the same in accordance with the present invention, the frequency of customer selections is calculated and analyzed for the respective articles to obtain information about customer needs for the articles.

In consequence, data on articles needed by the customers can be continuously gathered for evaluation of customer needs.

The foregoing and other objects, advantages, manner of operation and novel features of the present invention will be understood from the following detailed description when read in connection with the accompanying drawings.

BRIEF DESCRIPTION OF THE DRAWINGS

FIG. 10 is a processing flowchart of a second embodiment of an operation in accordance with the present invention;

FIGS. 11A to 13 are diagrams useful to explain a third embodiment according to the present invention;

FIG. 19 is a diagram showing the configuration of an article attribute data base;

FIG. 20 is a schematic diagram showing the structure of a coordinate data base;

FIG. 21 is a diagram showing a variation example of the constitution of an article master file to be adopted in an article guide system;

FIG. 22 is a diagram illustratively showing the configuration of an article selection history control file;

FIGS. 23A to 23F are diagrams showing examples of display screens; and

FIG. 24 is a schematic diagram for explaining a method of generating a coordinate data base.

DESCRIPTION OF THE PREFERRED EMBODIMENTS

Figure 1:
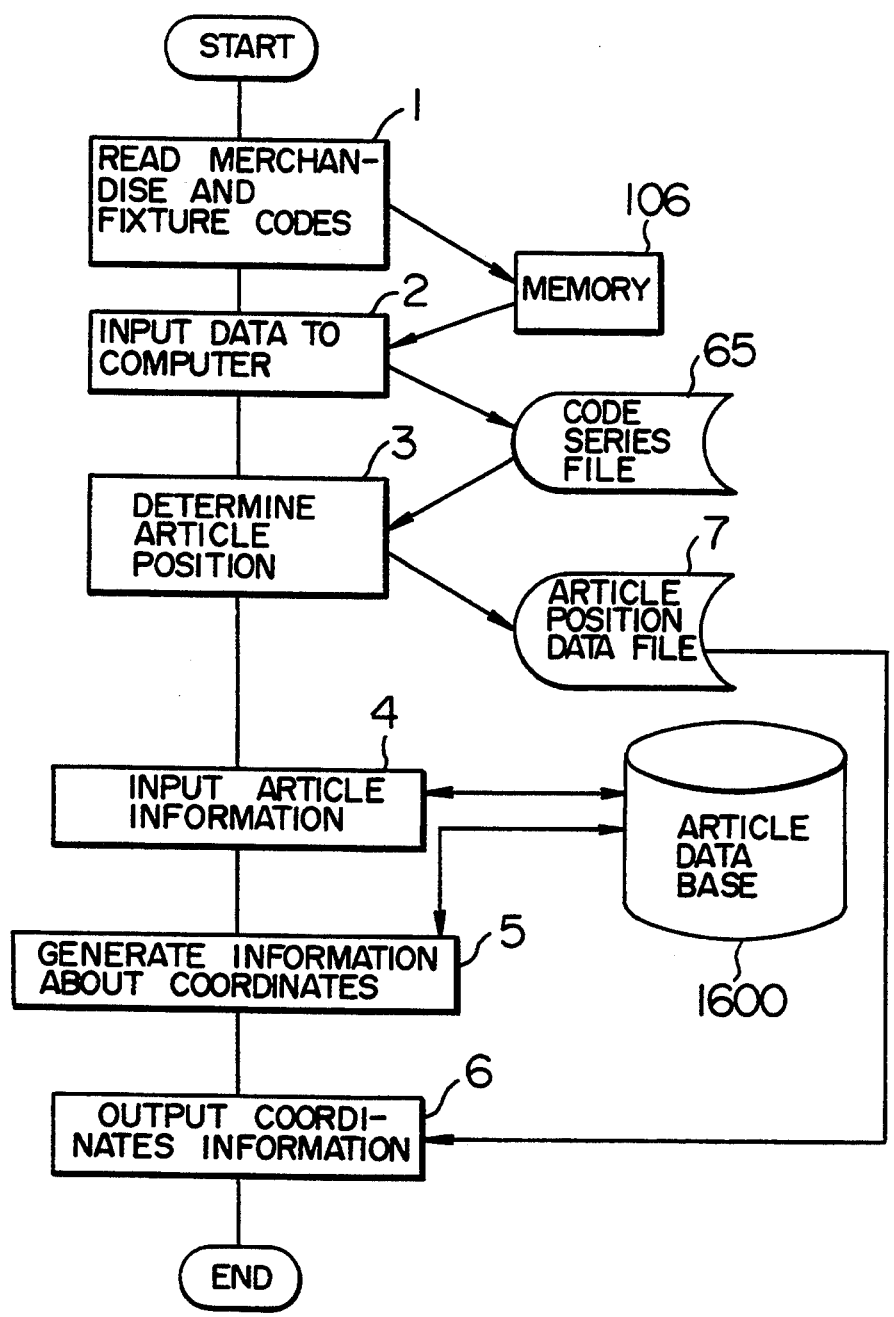
FIG. 1 is an overall flow diagram showing the operation of an embodiment of a merchandising system in accordance with the present invention.

Prior to a detailed explanation of an embodiment according to the present invention, a description will be given of a characteristic of the present invention.

Conventionally, during inventory or stock-taking in various stores, merchandise codes of respective articles are read so as to supply the obtained data to a computer system, which then processes the data for the inventory. More specifically, a label designating a merchandise code such as a bar code of each article (the code may be directly printed on the article or on a wrapper thereof) is obtained by use of a code reading apparatus. The resultant merchandise code data are fed to the computer system for appropriate processing thereof.

However, for the articles, the merchandise code reading sequence has not been conventionally determined. Namely, in general, the code reading operation is achieved in an arbitrary sequence for the following reason. That is, because the merchandise codes are assigned for inventory purposes, it is sufficient in this case that the numbers of respective articles can be obtained.

The idea to acquire the article display state based on the series of merchandise codes thus obtained in association with the preceding states thereof is the novel concept proposed in accordance with the present invention.

A feature of the present invention resides in that the article display state is obtained depending on the merchandise codes (series) thus read by means of a code reading apparatus. For this purpose, the sequence of reading merchandise codes is determined beforehand in association with positions where articles are displayed or arranged. Under this condition, for each article, based on an obtained merchandise code (series), a display position of the article corresponding to the merchandise code is recognized to acquire the article display state (i.e. merchandising information) based on the recognition result.

In a favorable mode according to the present invention, in addition to the procedure above, it is possible to recognize a fixture for a display of articles such that merchandise codes are read in association with the recognized fixture, thereby facilitating the acquisition of the article display positions. In this case, for the information items to identify fixtures, there are assigned labels including (fixture) codes, as in the case of merchandise codes, to respective fixtures. The fixture codes are fixed onto the respective fixtures so as to be read by means of the code reading apparatus used to read the merchandise codes.

Subsequently, a description will be given of an embodiment according to the present invention with reference to the drawings. The embodiment here is implemented in a corner handling clothes as a typical example to which the present invention can be applied. The present invention is efficiently applicable to any corner or department of a store where article display positions may possibly be altered, and can hence be further applied to departments for food, books, etc.

Figure 2A:
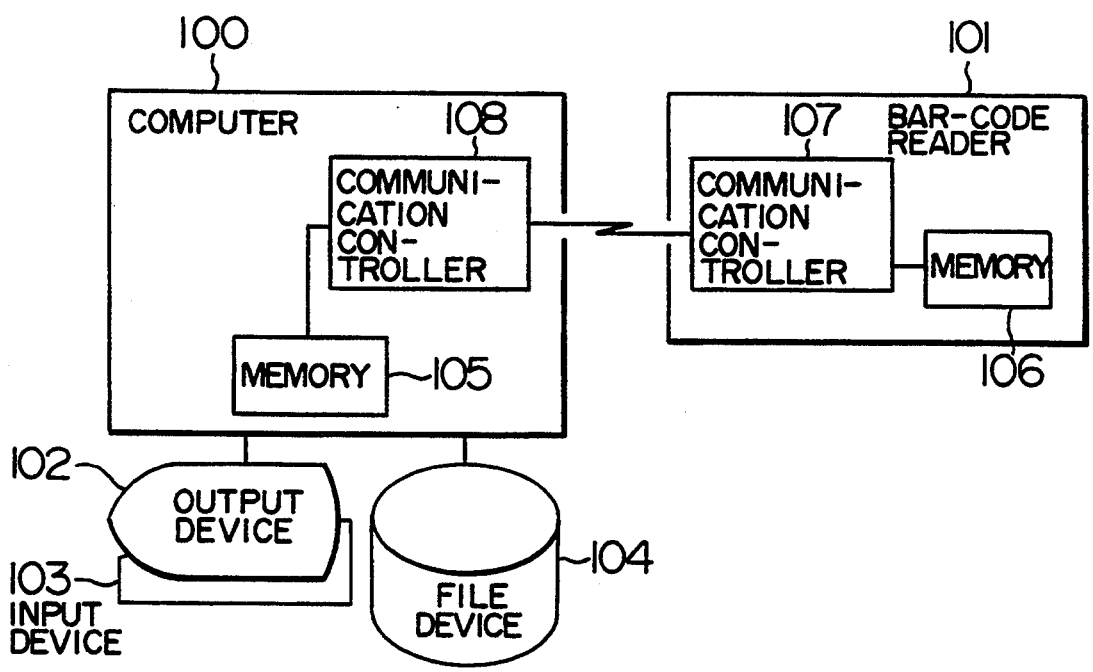
FIGS. 2A and 2B are diagrams showing examples of system configurations to which the present invention is applied.
Figure 2B:
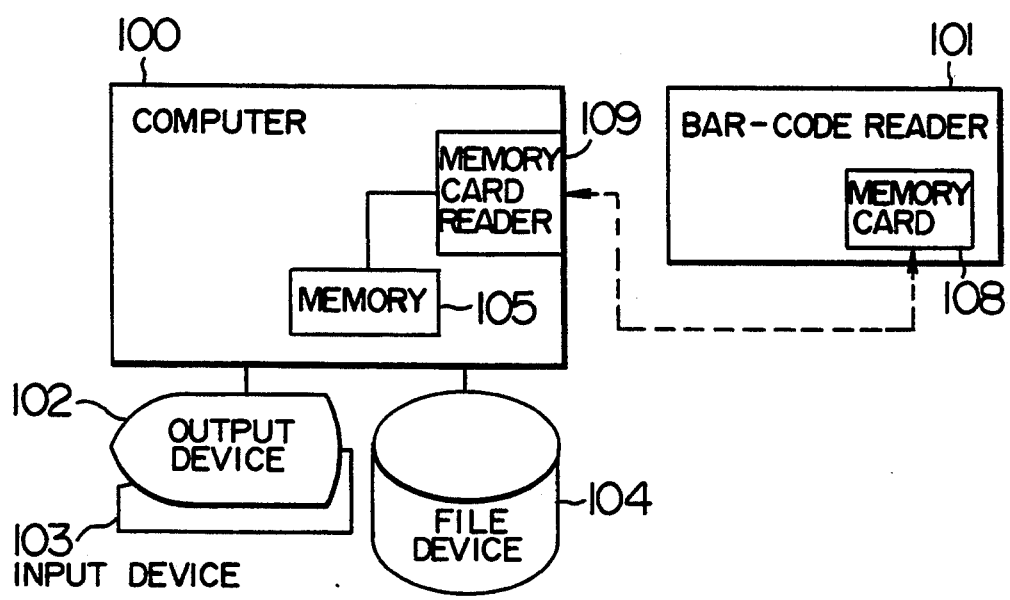

FIGS. 2A and 2B respectively show block diagrams of examples of an article display control system according to the present invention.

The system of FIG. 2A includes a computer 100 and a bar-code reader 101. The computer 100 is connected to an output device 102, an input device 103, and a file device 104, and includes a memory 105 and a communication controller 108. The output device 102 is disposed to produce an article display state and comprises a display, a printer, etc. A terminal device provided with a color graphic display is favorably installed as the output device 102, which will be described later. The input device 103 need only be implemented by use of such devices that input commands and data required for execution in the computer 100, for example a keyboard or a pointing device. The file device 104 is not an indispensable component of this system, but is required to be installed depending on the capacity of the memory 105 and the amount of data to be processed. The file device 104 includes a so-called external storage such as a magnetic disk or a floppy disk. A memory card may be used for this purpose in some cases.

The bar-code reader 101 includes a memory 106 and a communication controller 107. The memory 106 is disposed to primarily store therein data items such as merchandise codes and fixture codes read by the bar-code reader 101. As the apparatus for reading the merchandise and fixture codes, the bar-code reader 101 is described here as a specific example; however, when using merchandise and fixture codes in a code system other than a bar-code system, any appropriate reading apparatus associated therewith may be naturally employed. Moreover, in a case where information corresponding to merchandise and fixture codes is indicated by symbols not belonging to a code system, for example, when the codes are designated with letters and numerals, there may be adopted an optical character reader (OCR) or the like to read the information items.

The communication controllers 107 and 108 conduct communications therebetween and are commonly used, for example, for a communication via modems according to a basic procedure, a packet communication via packet assembly/disassembly facilities, and a communication via an acoustic coupler and a telephone line.

A description will now be given of the operation of the system shown in FIG. 2A. First, a merchandise code is read from a merchandise code label (on which the merchandise code is designated), which is fixed onto an article, by use of the bar-code reader 101. The obtained merchandise code is stored in the memory 106. Similarly, a fixture code is also read by the bar-code reader 101 to be loaded in the memory 106. The merchandise and fixture codes are read in a predetermined sequence, which will be described later.

The memory 106 is loaded with the merchandise and fixture codes in the reading order. These codes are read therefrom by the communication controller 107 in the code storing order, namely, in the reading order of the bar-code reader 101. The merchandise and fixture codes thus obtained are transmitted to the communication controller 108 of the computer 100. On receiving the codes, the communication controller 108 stores the received codes in the memory 105 in the code transmission order.

The merchandise and fixture codes are then fed therefrom to a code series file, the merchandise and fixture codes are stored in accordance with the read sequence of the bar-code reader 101. If the memory 105 has a capacity sufficient to store therein the code series file, the file device 104 may possibly be dispensed with. Using the merchandise and fixture codes thus loaded in a form of the code series file in the file device 104, the computer 100 executes a predetermined process to produce merchandising information. The obtained information is then sent to the output device 102.

Next, a description will be given of the configuration of the system shown in FIG. 2B. This system comprises a computer 100 and a bar-code reader 101, which is identical to that shown in FIG. 2A. A difference between these systems resides in a method of supplying a memory 105 of the computer 100 with merchandise and fixture codes read by use of the bar-code reader 101.

As can be seen from FIG. 2B, the merchandise and fixture codes read through the bar-code reader 101 are stored in a memory card 108. Although not shown in the figure, the memory card 108 is installed in a memory card writer. The memory card 108 loaded with a merchandise code and a fixture code is mounted on a memory card reader 109 associated with the computer 100. The memory card reader 109 reads the merchandise and fixture codes from the memory card and then stores the codes in the memory 105. Thereafter, the operations to be conducted by the computer 100 and other components are the same as for the system of FIG. 2A.

In this regard, although the storage order of the merchandise and fixture codes has not been described above with respect to the memory card 108 and the like in the system of FIG. 2B, the codes are to be stored in any case according to the reading order of the bar-code reader 101. In both cases of FIGS. 2A and 2B, for facilitating the processing, the storage and transfer sequence of the merchandise and fixture codes is favorably identical to the read sequence of the bar-code reader 101. However, the sequence may be reversed. In such a case, the order of these codes is restored in the processing by the computer 100.

A description will now be given of a variation, not shown, in association with the system configurations of FIGS. 2A and 2B.

On a sales floor where the present invention is adopted, let us assume that point-of-sale (POS) terminals are installed. These terminals are connected to the computer 100 in many cases. In this situation, considering a variation of the system constitution of FIG. 2A, merchandise and fixture codes read by the bar-code reader 101 need only be transferred via a POS terminal to the computer 100. This type of processing can be accomplished by means of bar-code readers already put to use. In connection with a variation of the configuration of FIG. 2B, the POS terminal need only be provided with a memory card reader to read contents of the memory card 108 in which the merchandise and fixture codes are loaded in advance by use of the bar-code reader 101, thereby transferring the contents to the computer 100. Based on the description above, this variation can be easily implemented by those skilled in the art.

For an appropriate decision of the system configurations above, consideration need only be given to types of industries using the system, the number of associated stores, the size of each store, and relationships with respect to systems in which POS terminals have already been installed.

In order to facilitate understanding of the description of embodiments according to the present invention, FIG. 1 shows a functional flowchart associated therewith.

In this flowchart, merchandise and fixture codes are read by use of the bar-code reader 101 in a predetermined read order (step 1), which will be described later. The obtained codes are stored in the memory 106. As already described, the merchandise and fixture codes are fed from the memory 106 to the computer 100 to be loaded in a code series file 65 (step 2). Since these codes are stored therein in the reading sequence of the bar-code reader 101, a display position can be determined for each article based on the storage sequence. The results of the decision are stored in the article position data file 7 (step 3). Displayed positional information of each article stored in the file 7 is then converted into merchandising information 9 in a predetermined form for convenience of the users of the system so as to be delivered to the output device 102.

Steps 4 to 6 are performed to select a coordinate item, which will be described later.

A description will now be given in detail of each step by use of the functional flowchart of FIG. 1.

Figure 3A:
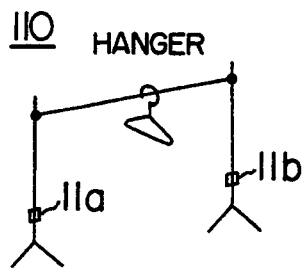
FIGS. 3A, 3B, and 3C are diagrams showing examples of article display fixtures.
Figure 3B:
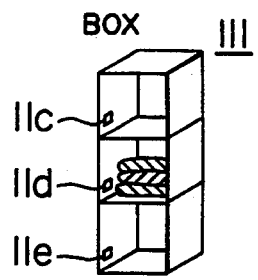
Figure 3C:
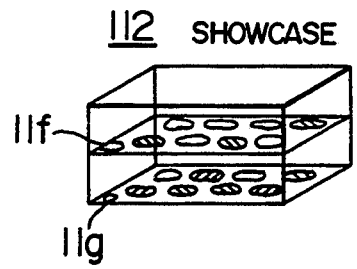

First, the step 1 related to the merchandise and fixture code read operation will be described. A merchandise code label denoting a merchandise code is assumed to be fixed onto an article as described above. A fixture code label 11$i$ (i=a, b, c, etc.) indicating a fixture code is pasted onto a fixture, for example, as shown in FIGS. 3A to 3C. For a hanger rack 110 as shown in FIG. 3A, fixture labels 11$a$ and 11$b$ are fixed onto the respective ends thereof. The fixture code labels are called fixture end bar-code labels in some cases. For a box 111 as shown in FIG. 3B, fixture code labels 11$c$, 11$d$, and 11$e$ are pasted onto respective box partitions thereof as shown in FIG. 3B. The fixture code labels are occasionally called box bar-code labels. For a showcase as shown in FIG. 3C, fixture code labels 11$f$ and 11$g$ are fixed onto respective sections thereof. The fixture code labels are called showcase section bar-code labels in some cases.

The fixture code labels are not limitatively pasted onto the positions of FIGS. 3A to 3C. Namely, as will be described herebelow, the labels need only be pasted onto appropriate positions for identifying respective partitions, sections, etc. of the fixture above.

Furthermore, for fixtures other than those above, the fixture code labels need only be fixed onto positions depending on characteristics of the fixtures, which will be easily understood from the examples and descriptions above.

Figure 4:
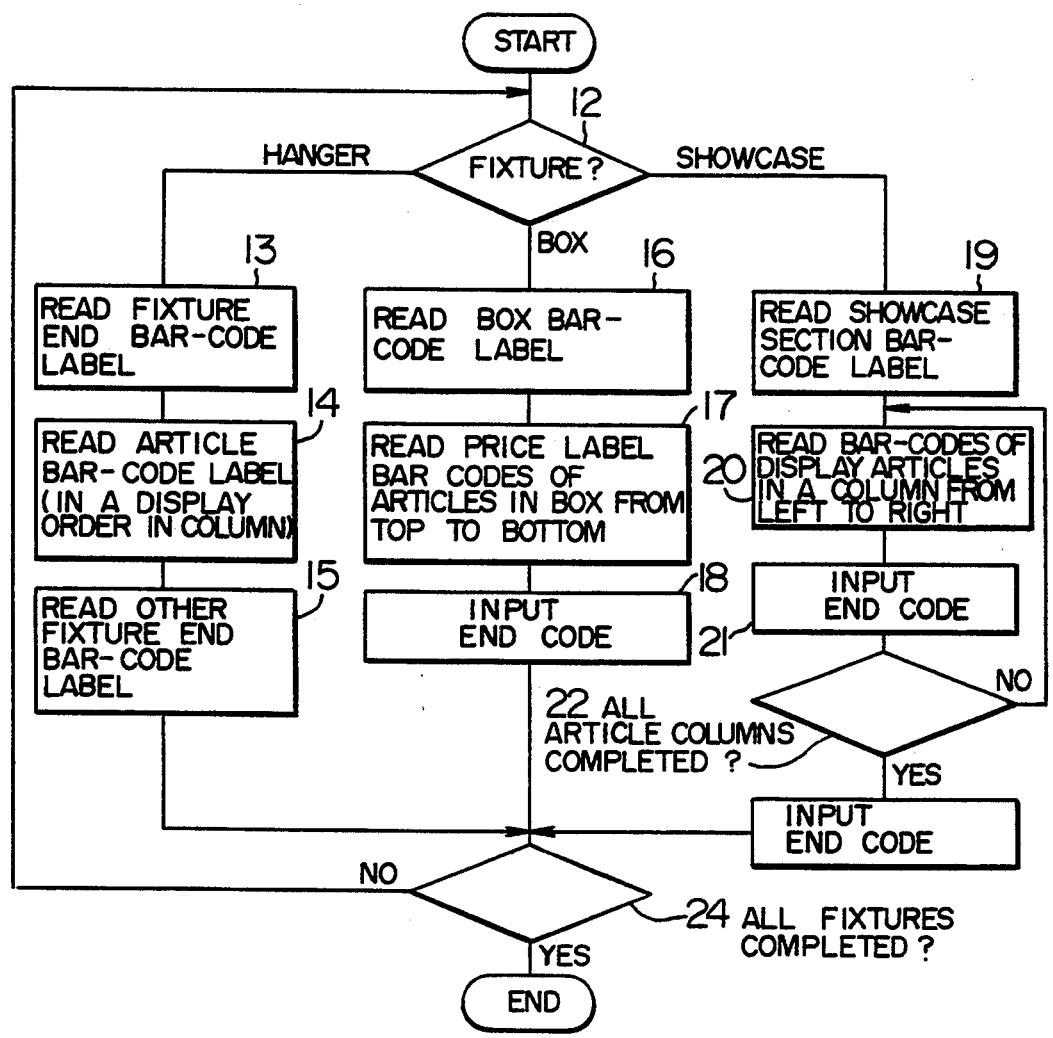
FIG. 4 is a flowchart showing an example of a merchandise code read procedure.

Referring now to FIG. 4, a description will be given in detail of an operation to read the merchandise and fixture codes. The sequence of reading these codes varies depending on type of fixture (step 12). When the fixture is the hanger rack 110 of FIG. 3A, the fixture end bar-code label 11a is read by use of the bar-code reader 101 (step 13). Subsequently, along a direction from the label 11a to the label 11b, the article bar-code label of each article is sequentially read by means of the bar-code reader 101 (step 14). When the read operation is completed for the code labels of all articles arranged on the hanger rack 110, the fixture end bar-code label 11b is read by the reader 101 (step 15).

In a case where the fixture is the bunker or box 111 of FIG. 3B, the bunker bar-code label 11c, for example, is read (step 16). This is because the read operation may be accomplished in an arbitrary reading order with respect to the partitions of the box since the respective partitions are assigned with different box or fixture code labels associated with different fixture codes. However, in a preferred mode of the present invention, the read operation is desirably achieved in a direction from the top to the bottom or vice versa.

Next, the article bar-code label of each article is read by use of the bar-code reader 101 in the box partition on which the box bar-code label 11c is fixed (step 17). The article bar codes are read in a direction (when a plurality of articles are arranged in the pertinent box partition) from top to bottom or vice versa. When the read operation is completely finished for all articles therein, the operator depresses a predetermined button disposed on the bar-code reader 101 to input an end code (step 18). In place of the end code, the box bar-code label 11c may be read again. Moreover, the step 18 may be eliminated for the following reason. That is, at the completion of the label read operation on all the articles of the box partition, the fixture bar code assigned to another fixture is read such that the obtained code may be adopted for the end code.

When the fixture is the showcase 112 of FIG. 3C, the showcase section bar-code label 11f is read by the reader 101 (step 19). In the case of the showcase 112, articles are generally arranged in a two-dimensional manner as shown in FIG. 3C. In this situation, the read operation is first conducted in the rear-most column of the showcase section. Subsequently, in each column, the article bar-code label of each article is read from the left-most article to the right-most article or vice versa by means of the bar-code reader 101 (step 20). After this operation is completed, an end code is inputted from the reader 101 (step 21). The process above is repeatedly carried out for the remaining columns of the section of the showcase 112 in a direction towards the front-most column. When the read operation is completed for all articles therein (step 22), an end code is inputted (step 23). For the end code, as in the case of the box-type fixture, the showcase section bar code 11f may be read again. In this regard, the articles are not arranged in columns in some cases. In such a case, the article bar-code labels need only be read in a sequence similar to the sequence above in which the articles are displayed in a column.

The processing above is repeatedly accomplished in a range of articles for which the display state is to be collected, for example, in the overall store, on all sales floors, on a particular floor, or in or on all specified fixtures (step 24).

In the processing above, each time an article (bar-) code label or a fixture (bar-) code label is read by the bar-code reader 101, the obtained code is loaded in the memory 106. As described above, the merchandise and fixture codes are stored in the memory 106 according to the code reading order of the reader 101. When the merchandise and fixture codes read operation is completely finished in a predetermined sequence in a store, the code series (including the merchandise and fixture codes) are transferred in step 2 from the memory 106 to the code series file 65 of the computer 100.

As shown in FIG. 1, the computer 100 reads the merchandise and fixture code series from the code series file 65 to determine for each article code a position in a fixture (step 3), thereby writing the positional information in the article position data file 7. The article position determination (step 3) is conducted in a reverse order as compared with the merchandise and fixture code read operation of FIG. 4. Namely, for an easier understanding, the merchandise bar-code read processing and the fixture bar-code processing are to be respectively compared to the merchandise code write processing in the article position data file 7 and the determination of the article code write position in the file 7.

Figures 5, 6:
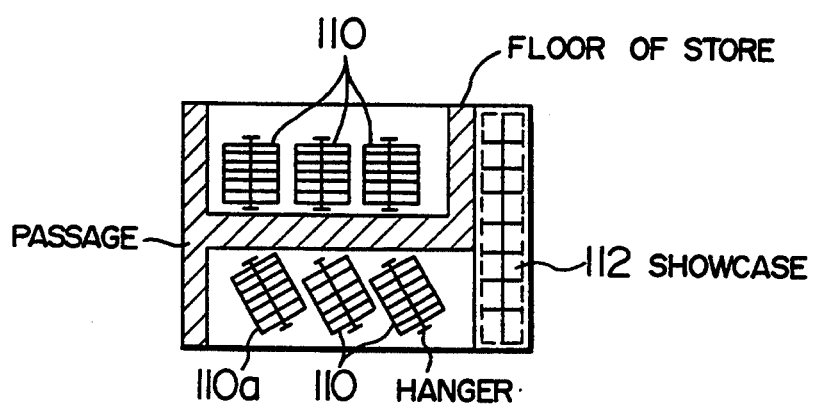
FIG. 5 is a diagram showing an example of a table layout associated with an article position data file.
FIG. 6 is a plan view illustratively showing a store floor layout.

FIG. 5 shows the constitution of the article position data file 7, which includes, for each store 115 or sales floor, data in a table format. The table format data comprise a fixture identification 116 and a fixture type 117, which are used to identify fixtures (n in number) employed in the store; a fixture code 118 of a bar-code label pasted on the fixture; and a positional coordinate item thereof 119. This table further includes a merchandise code series 120, which is a series of data for a hanger, for each section of a showcase (a code e is used to represent a two-dimensional array), or for each box partition of a bunker. In the table, merchandise codes are represented as ai and bj.

Once the article position data are loaded in the file 7, the computer 100 processes the loaded data to output the merchandising information.

A description will now be given of a first embodiment of the operation for outputting the merchandising information based on the article position data. FIG. 6 shows a plan view of a floor of a store to be presented on an output device 102. The plan view includes hanger racks 110 and showcases 112. The respective fixture areas are subdivided depending on the number of display articles such that various kinds of article attribute information items (such as colors, textures, sizes, and designs) are displayed in association with color attributes including a hue, a shade of color, and a chroma value. In addition to the article attribute information items, there are presented display information items such as a price zone, season code, and an article age (the number of days elapsed from the purchase day of an article). For an easy recognition of the states of display articles, the display information items above are presented on the screen in the layout of FIG. 6.

Figure 7:
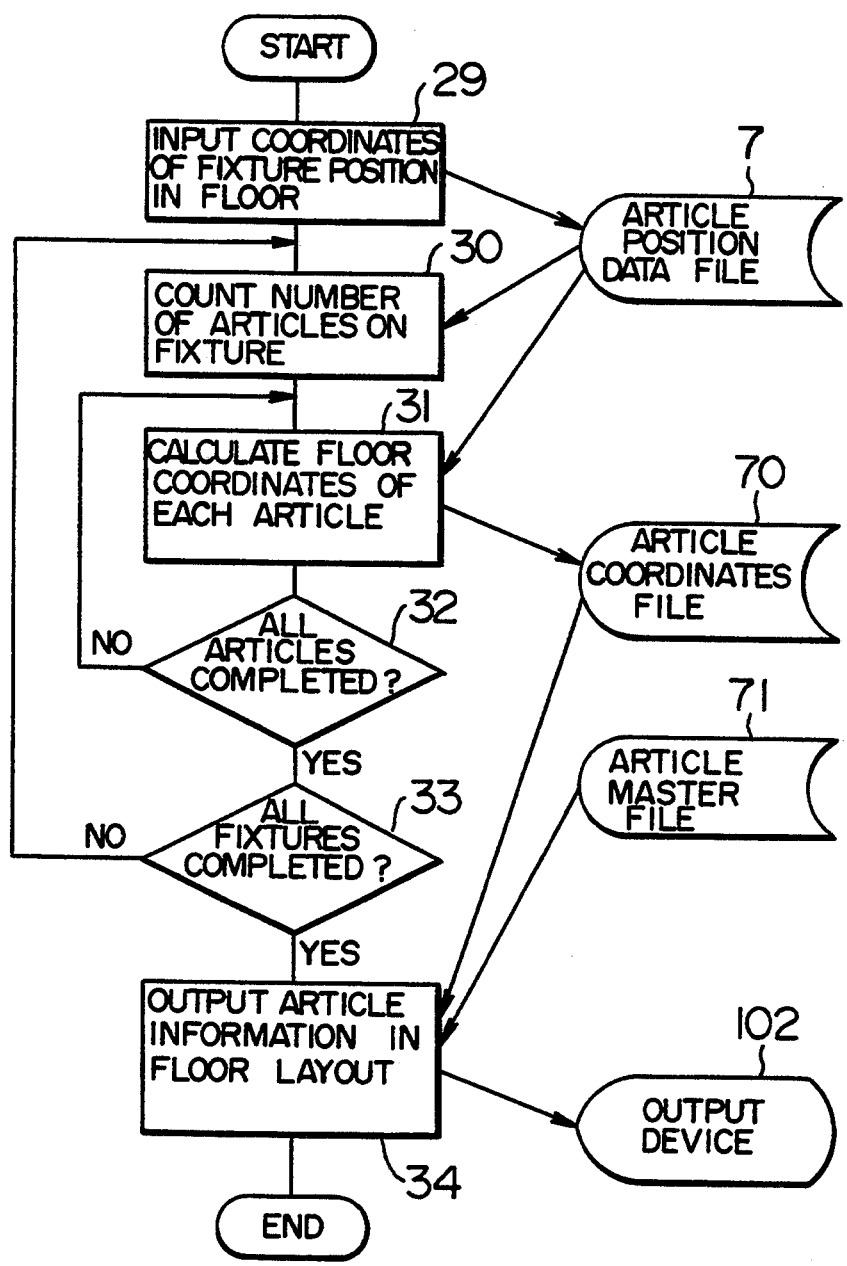
FIG. 7 is a flowchart showing a first embodiment associated with the output of merchandising control information.

Next, the output processing of the article attribute information items and the like will be described in detail. FIG. 7 shows a flowchart of the processing executed by the computer 100. First, a fixture position coordinate item 119 is inputted to the article position data file 7. For example, assuming that the hanger rack 110a of FIG. 6 has a fixture identification denoted as 1, coordinate values $(x_1, y_1)$ and $(x_2, y_2)$ are inputted. Similarly, for all fixtures presented in the plan view of the floor, coordinate values thereof are inputted (step 29).

Next, the number of articles in each fixture is counted (step 30). This is accomplished by counting the number of merchandise codes constituting the merchandise code series 120 in the article position data file 7. For example, in a case of a hanger with a fixture identification designated as 1, since the merchandise codes are specified as $a_1, b_2, \ldots, a_l$, the value of l is assumed as the count value. Subsequently, for each article in each fixture, a position coordinate item is computed (step 31).

Figures 8, 9:
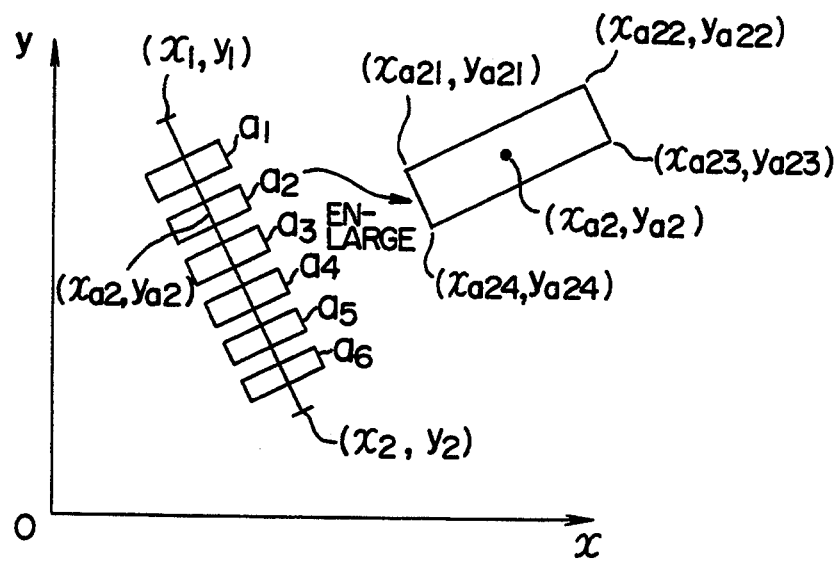
FIG. 8 is a schematic diagram useful to explain in detail an article arrangement.
FIG. 9 is a diagram showing the configuration of an article coordinates file.

The method of computing the position coordinate item of each article will be described by referring to FIG. 8 showing an enlarged view of the hanger rack 110a of FIG. 6. In the configuration of the coordinate system of FIG. 8, an origin is uniquely set to an arbitrary position in the overall floor. Since the number of articles displayed on the hanger rack 110a is l, coordinates $(x_i, y_i)$ of a display position of an article i (1 = 1, 2, ..., l) are obtained as follows.

$$\begin{cases} x_i = x_1 + \dfrac{x_2 - x_1}{l} \cdot i + x_1 \\ y_i = y_1 + \dfrac{y_2 - y_1}{l} \cdot i + y_1 \end{cases}$$

Since an article in the floor layout is desirably presented as an item having a certain size, it is only necessary to display a contour of a preset size centered on the coordinates $(x_i, y_i)$. In a case, for example, where clothing articles can be crammed in a fixture, such a preset size cannot be reserved for each article. In this situation, the interval between adjacent articles in an identical fixture need only be equally subdivided, for example, thereby presenting the predetermined size in a reduced form or in a form reduced in a particular direction. In the case of FIG. 8, there exists a sufficient gap between adjacent articles displayed. The processing step 31 is repeatedly accomplished for all articles present in the same fixture (step 32). Moreover, the processing steps 30 and 31 are repetitiously carried out for all objective fixtures (step 33). As a result, there are obtained contents of the article coordinates file 70 of FIG. 9. Incidentally, in the flowchart of FIG. 1, the article position data file 7 and the article coordinates file 70 are collectively represented as the article position data file 7.

Next, article information items are outputted to the floor layout by use of the display 102 (step 34). In the step 34, for each display article, an attribute item is read from an article master file 71 (which will be described later) to generate display information in a preset form such as a rectangle associated with the display article as shown in FIG. 6, for example, by painting the form in a color or by presenting the form as a hatching portion.

FIG. 10 shows a second embodiment of the operation to output merchandising information based on actual article display data. In this embodiment, during a job in which an operator collecting store display information reads the bar code of each display article by use of a handheld bar-code scanner, problems related to the article display are presented on the bar-code scanner. For this purpose, in the processing flow of FIG. 10, an article code series associated with an objective fixture is first read from the article position data file 7 (step 36). For each article code, article attributes such as color and size are then read from the article master file 71 (step 37). In general, when articles are displayed or arranged in a random fashion with respect to attributes thereof such as the color, shape, and size, the appearances of the articles thus presented become unfavorable and hence customers are not motivated to buy displayed articles. Instead, according to the invention, the articles are favorably arranged in a predetermined order, for example, in sequences of the size and hue for each color and for each texture.

In a step 40, the attribute values are sorted such that a sequence of articles associated with the sorted attributes is compared with the actual display sequence. As a result of the comparison, whether or not there exists a problematic display article is determined by referencing attribute information obtained from the article master. If this is the case, an abnormality warning display step 41 is executed to display a warning message including article name, article attributes, display position, etc. of the pertinent article on a display 42 of the handheld bar-code scanner.

FIGS. 11 to 13 show a third embodiment of the operation to output merchandising information. It is assumed here that, based on data of the article display positions and article image information beforehand prepared, there is produced an article display image in a simulated manner. Namely, an image similar to an image actually viewed in a store is presented on the display. FIG. 11A illustratively shows images of all articles which might be possibly displayed in a store. Each article image is process through graphic processing or image processing to obtain a pattern image (primarily related to a contour of the article), a texture image, and a color code. The pattern and texture images are assigned with respective numbers (denoted by # in the figures). Information items of the article image including these numbers and the color code are loaded beforehand in an article image master table shown in FIG. 11B. FIG. 11C shows examples of the pattern and texture images.

FIGS. 12A and 12B show a process to create an image of articles arranged on a hanger rack based on article code series stored in the article position data file 7. First, a composite article image of an article at a rear-most position is superimposed onto a hanger image. Subsequently, a composite article image of the next article is drawn in an overlapped manner. In this operation, only data of the inner portion of each image to be overlapped are used to draw the composite image with the outside contour of the article kept unchanged, thereby obtaining a composite image including articles arranged on a hanger rack in an overlapped fashion. The above operation is repeatedly conducted for all the articles. As a result, an image of the objective articles arranged on a hanger rack in an overlapped manner is presented on the display as shown in FIG. 12B.

FIG. 13 shows a flowchart for executing the operation above in a computer. First, the system receives a fixture identification code specified from a terminal (step 44). In a step 45, an image of the specified fixture is obtained from a fixture image master 46 so as to load the image in an image memory 47. A step 48 retrieves the article position data file 7 to obtain an article code series of the specified fixture. For each article code, the system references the article master file 71 (FIG. 11B) to obtain a pattern image number, a texture image number, and a color code which are associated with the article code.

In a step 51, the system references an article image master file 52 (FIG. 11C) to obtain a pattern image and a texture image so as to combine these images with each other. Moreover, a step 53 conducts a color painting operation based on the color code. In a step 54, a fixture image is read from the image memory 47 such that the composite article image is superimposed thereon. The image superimposing operation is repeatedly performed for all article codes to produce data of a hanger display image in the image memory 47. An image output step 55 presents the resultant image on the output device 102.

Figure 14:
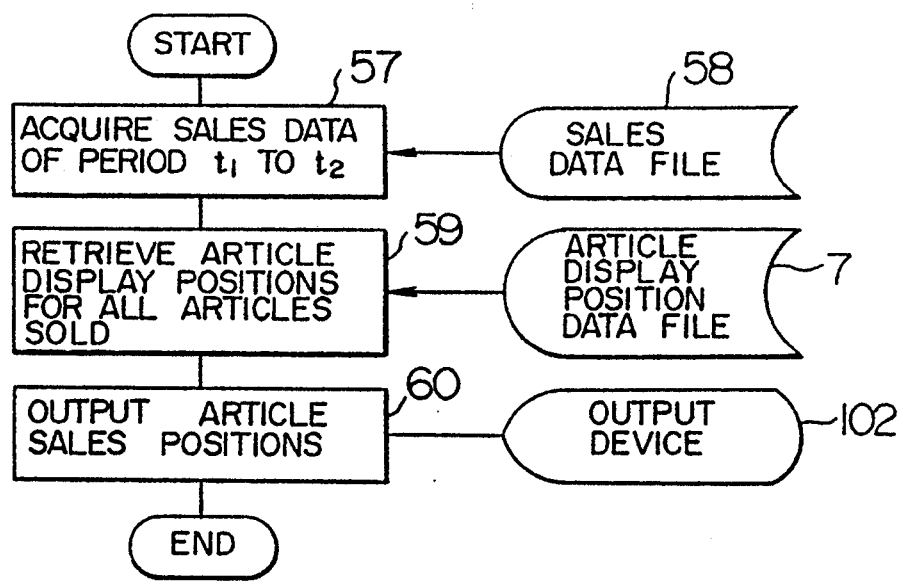
FIGS. 14 and 15 are diagrams for explaining a fourth embodiment according to the present invention.
Figure 15:
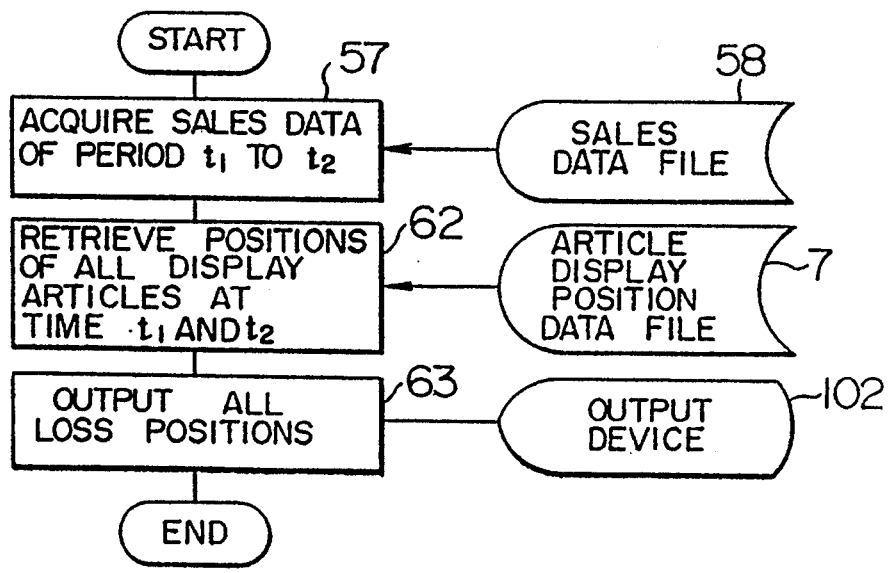

FIGS. 14 and 15 are flowcharts for explaining a fourth embodiment according to the present invention. In this embodiment, based on information about article display positions, the sales positions and loss positions are presented in the floor layout of FIG. 6. A step 57 accesses a sales data file 58 to separate therefrom sales data related to a period ($t_1$ to $t_2$). A step 59 reads a display article code series at a point of time $t_2$ from the article display position data file 7 to conduct a retrieval for the sales article purchased. When an objective article is found, the associated position is assumed as a sales article position. On the other hand, a step 62 of FIG. 15 reads article display positions respectively at points of time $t_1$ and $t_2$ from the position data file 7. With respect to the sales data and the display data at the point of time $t_2$, the system reflects a retrieval for the display article at the point of time $t_1$, thereby detecting a position of an article for which the retrieval at $t_2$ results in a failure. Steps 60 and 63 respectively output the resultant sales article and loss positions to the output device 102.

Figure 16:
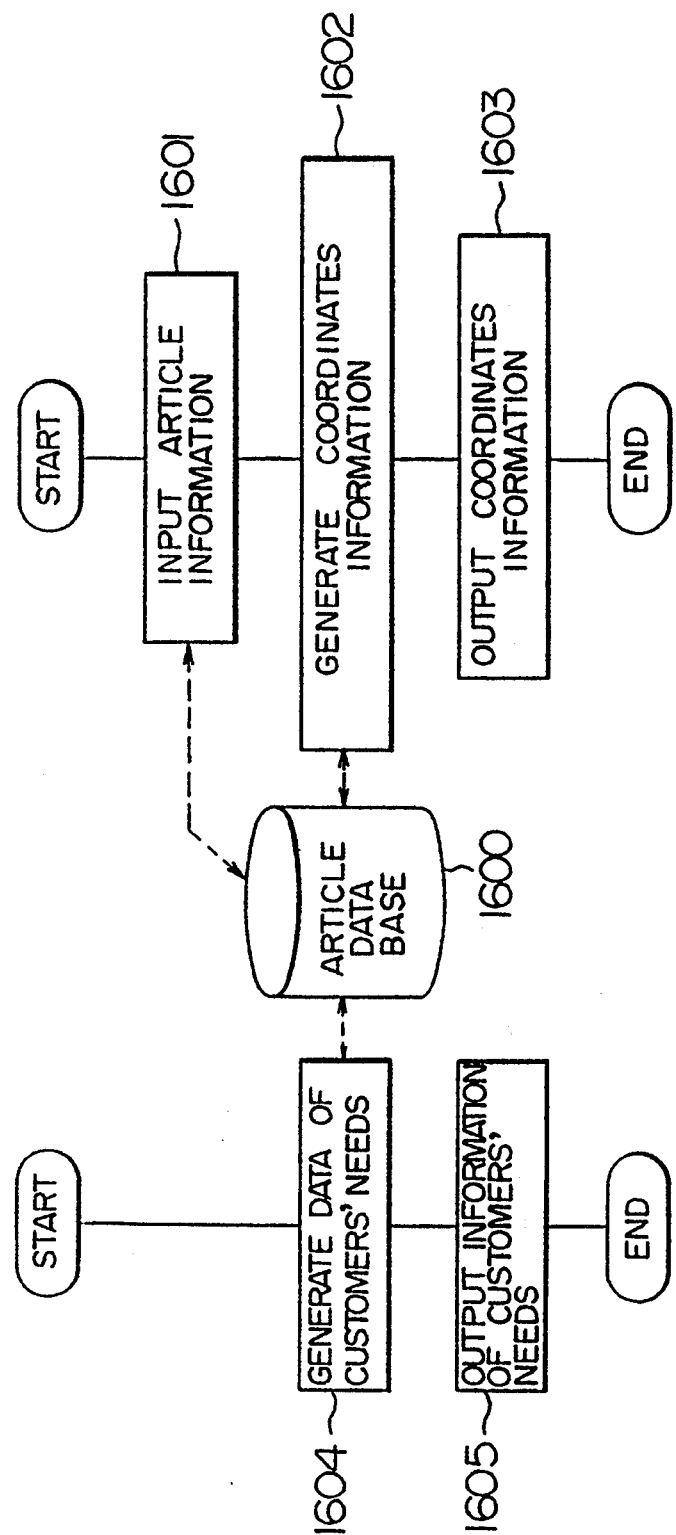
FIG. 16 is a general flowchart showing an outline of an article guide method.

FIG. 16 is a general processing flowchart schematically showing the operation of an article guide method. In this flowchart, steps 1601 to 1603 are substantially identical to the steps 4 to 6 of FIG. 1, respectively.

A step 1601 is disposed to input key article or goods information and coordinate item information. Namely, there are inputted identification codes (e.g. "12345678") respectively of primary articles or goods which are assumed to be desired by the customers, and coordinate items to be combined with the articles or attribute data (e.g. a sweater with a V-shaped neck) thereof. When the attribute data of a key article are inputted, an article data base 1600 is retrieved to identify an identification code associated with the key article.

A step 1602 produces coordinate information. Namely, based on the obtained identification code of the key article and the coordinate article information, the article data base is retrieved to acquire an identification code (e.g. "87654321") of a coordinate item suitable for the key article and/or predetermined attribute data (such as a pleated skirt).

A step 1603 outputs the coordinate information. In this step, for example, the coordinate information is processed to create an image, thereby presenting the image on a display.

For the customers, there is presented information about coordinate items suitably matching key goods. This facilitates a decision for a purchase of an article. In other words, the sales promotion is achieved on the store side.

On the other hand, the article information supplied from the customer to the system is stored in the article data base 1600.

In a step 1604, the stored information items and the like are processed to attain respective total values, thereby producing data of customers' needs.

A step 1605 outputs the information items of customers' needs.

With the provisions above, the customers' needs can be collected for analysis thereof.

Figure 17:
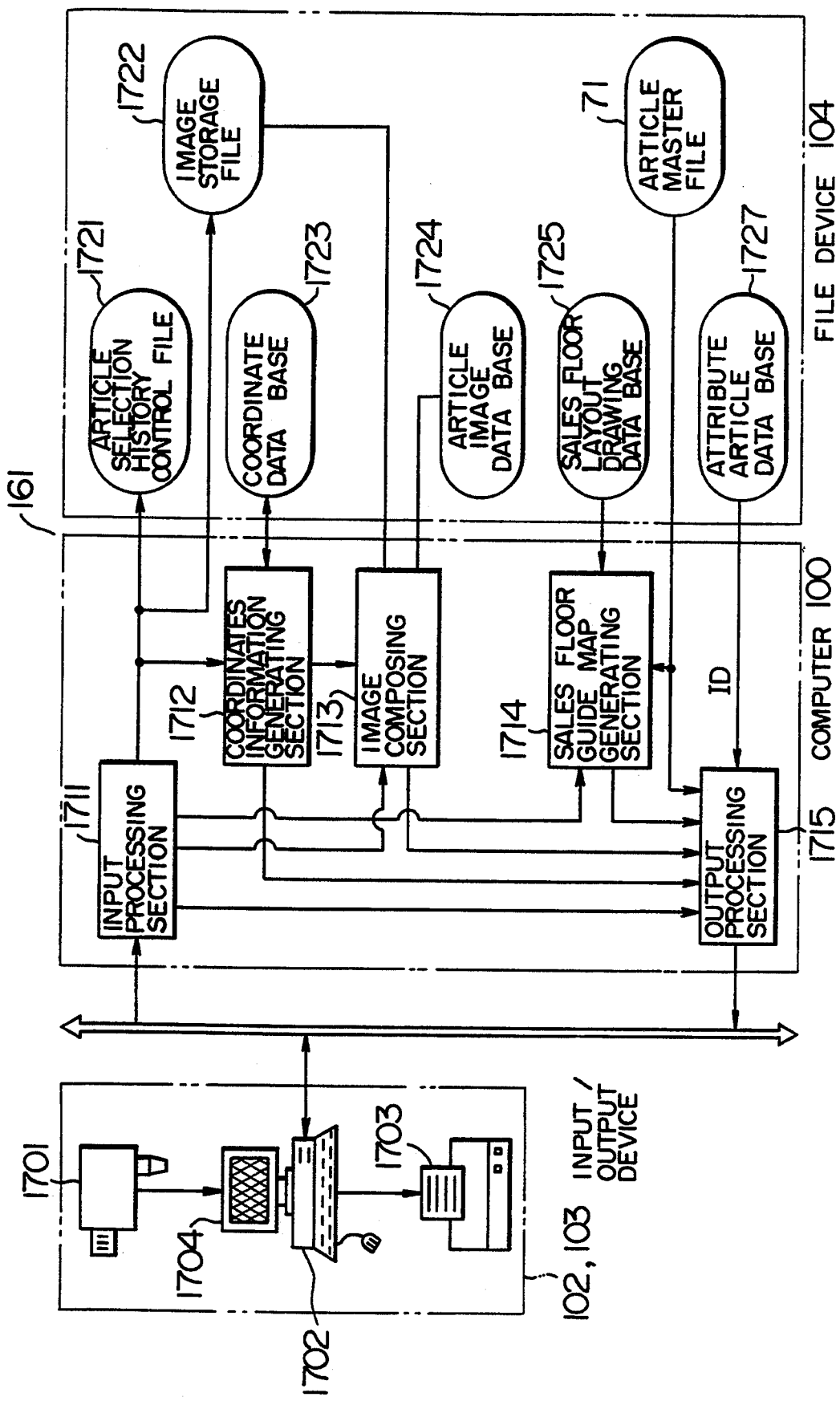
FIG. 17 is a diagram schematically showing an article guide system to which the present invention is applied.
Figure 18:
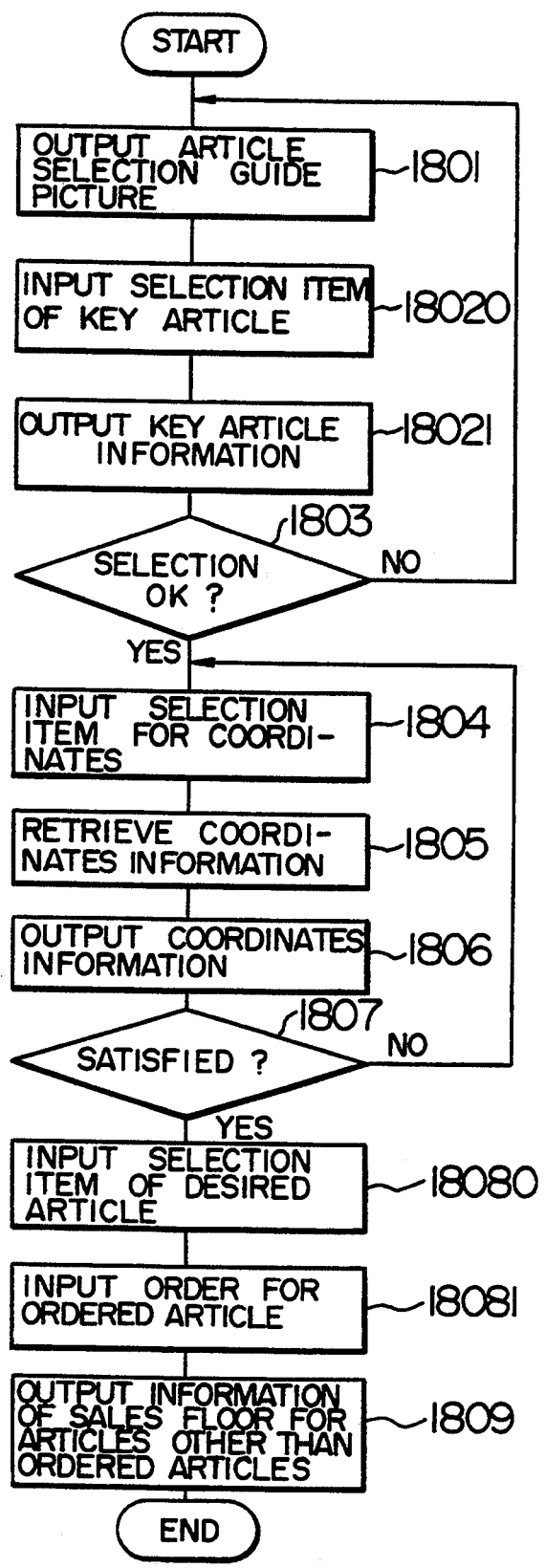
FIG. 18 is a flowchart showing the operation of the article guide system of FIG. 17.

Referring next to FIGS. 17 and 18, a description will be given in detail of an article guide system using the article guide method above in accordance with the present invention.

FIG. 17 shows the configuration of an embodiment of an article guide system according to the present invention; whereas, FIG. 18 is a flowchart showing the operation of the article guide system of FIG. 17.

This article guide system 161 is assumed to handle only such goods as dresses and ornaments associated therewith (i.e. the system is equivalent to a system in which key goods are beforehand assigned with attribute data of ornaments or accessories thereof). The system 161 is assumed to be installed in a corner for dresses and ornaments of a department store.

First, a step 1801 outputs on a display of a workstation 1702 a first screen 2301 as shown in FIG. 23A.

The customer inputs information about the sex and age of the person who wears a key article. For this input operation, the customer touches a touch panel 1704 disposed onto the display by a finger to select a desired section or icon on the screen. For example, when the user selects a portion related to a female of 28 years old, the selected portion is displayed with a higher luminance intensity as indicated by a shade portion in FIG. 23A. Confirming that the selected portion has been correctly displayed with a higher intensity, the customer selects an icon designated as "Confirmation".

In response thereto, the workstation 1702 outputs on its display a second screen 2302 as shown in FIG. 23B.

The customer then inputs a type, a usage purpose, and a feeling or sense associated with the key article. For example, if the items of a sweater, a private use, and an urban sense are selected, the portions of FIG. 23B are displayed with a high intensity. Confirming that the selected portions have been properly displayed with a higher intensity, the customer depresses an icon designated as "Confirmation".

Figure 23C:

The workstation 1702 then outputs a third screen 2303 as shown in FIG. 23C on its display unit.

The user inputs a material, a shape, etc. of the key article to confirm that the selected portions have been properly displayed with a higher intensity. Thereafter, the customer depresses an icon of "Confirmation".

A step 18020 is disposed to receive the inputted attribute data of the key article through an input processing section 1711. The input history related to the input items is stored in an article selection history control file 1721. FIG. 22 shows an example of the history control file 1721.

The workstation 1702 processes the input data as follows. For the input attribute data of the key article, if a plurality of attribute data items are selected for an item, the system connects these items to each other by use of a logical operator OR. When the selection input is completely missing, all selection items are assumed to be selected. Attribute data items respectively of different items are linked with each other by use of a logical operator AND. Under the conditions above, the system retrieves an attribute article data base 1727 to detect identification codes of candidates of the key article satisfying the conditions above. FIG. 19 shows an example of the attribute article data base 1727. Based on the obtained identification codes, an access is made to an article image data base 1724 to produce an external appearance image of the key article.

On the other hand, the workstation 1702 beforehand acquires an image of the face of the customer by use of a camera 1701 to store the image in an image storage file 1722 via the input processing section 1711.

In an image composing section 1713, the appearance image of the key article is combined with the face image loaded in the image storage file 1722 to display the resultant image on a display via an output processing section 1715.

Figure 23D:

The operation above corresponds to a step 18021 to output key article information. FIG. 23D shows a display example of a composite image on a display.

In a step 1803, the customer selects a desired key article from the candidates of the key article displayed in the composite image. If the desired key article is missing, the customer selects an icon denoted as "Initial" to return to the first screen. Or, the customer depresses an icon of "Return" to display the previous screen, namely, control is proceeded to the step 1801 again so as to change the attribute data. The operations above are repetitiously accomplished until the desired key article is obtained.

When the desired key article is selected, control is passed to a step 1804.

Figure 23E:
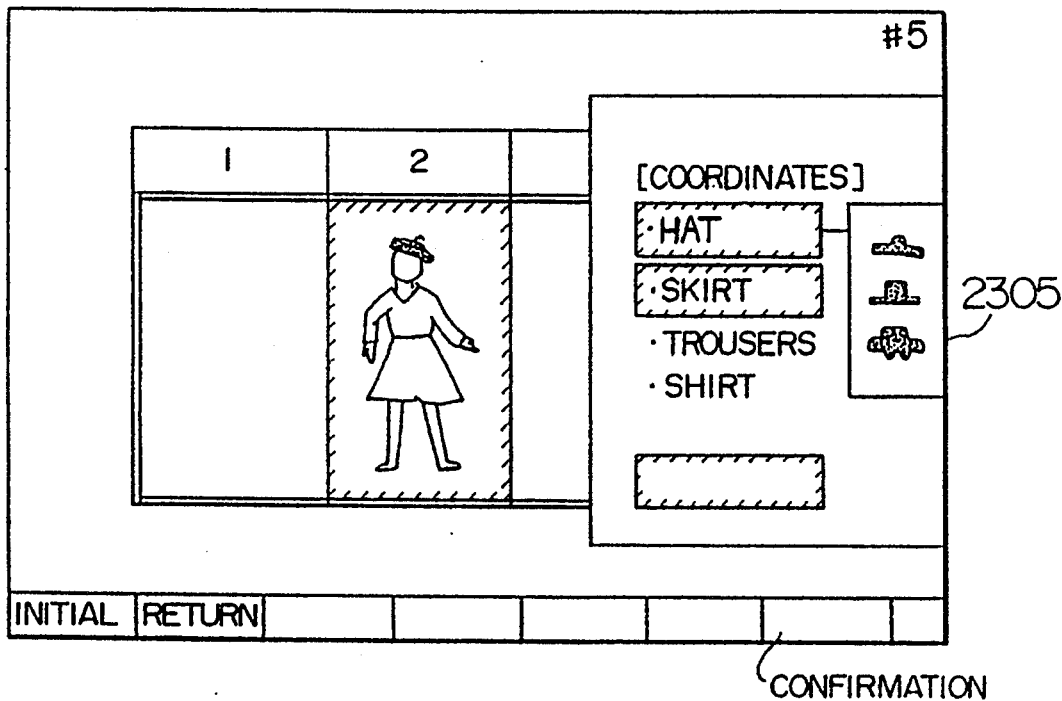

In the step 1804, a coordinate information generating section 1712 retrieves a coordinate data base 1723 by use of the identification code of the key article to extract candidates of coordinates suitable for the key article, thereby presenting attribute data items (e.g. a hat, a skirt, shoes, etc.) on the display. FIG. 20 illustratively shows contents of the coordinate data base 1723. An image example of the contents is shown in a window screen of FIG. 23E. The customer selects a desired coordinate item from the candidates thus displayed.

In a step 1805, the coordinate information generating section 1712 retrieves again the coordinate data base 1723 depending on the attribute data of the key article and the attribute data of the coordinate item to obtain identification codes of coordinate items satisfying the retrieval conditions.

In a step 1806, the image composing section 1713 acquires, by use of the identification code of the coordinate item, an appearance image of the coordinate item from the article image data base 1724 to combine the appearance image with the face image of the customer, thereby outputting the composite image on a display via the output processing section 1715. The resultant composite image is shown in the central portion of FIG. 23E.

In a step 1807, if the coordinates of the composite image are favorable, the customer selects an icon of "Confirmation"; otherwise, an icon of "Return" is depressed to display the previous screen image. Namely, control returns to the step 1804 to alter the attribute data. These operations above are repeatedly accomplished until desired coordinate items are obtained.

In this connection, the coordinate information generating section 1712 supplies the coordinate data base 1723 with the attribute data of coordinates inputted from the customer for the key article to reflect the added data onto the coordinate data base 1723.

When the coordinate item selection is satisfactorily finished, control is transferred to a step 18080.

In this step, the customer selects desired items from the key article and coordinate items for the purchase thereof.

In a step 18081, the workstation 1702 checks the article master file 71 for the stock of the articles and items. For any items which are desired by the customer and which belong to advance order items not kept in stock, the system accepts the order for the advance order items. FIG. 21 shows contents of the article master file 71.

Figure 23F:
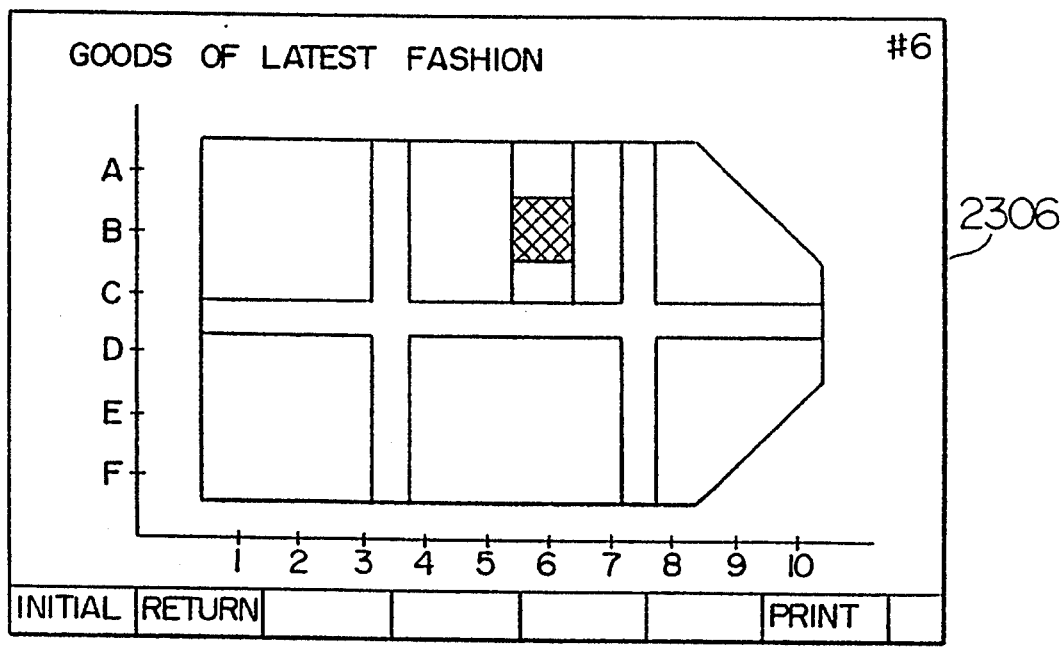

In a step 1809, if the desired items are found in stock, a sales floor guide map generating section 1714 is initiated. This section 1714, based on the identification code of each of the items above, retrieves a sales point and a sale position code and then accesses a sales floor layout drawing data base 1725 depending on the sales position code to obtain a sales floor guide map so as to produce a composite image. The resultant image is displayed via the output processing section 1715 onto a display. FIG. 23F shows a display example of the composite image.

The workstation 1702 outputs the identification code and a predetermined attribute data item (e.g. an article name) to the printer 1703, which in turn produces a hardcopy thereof. Moreover, the printer 1703 also generates a hardcopy of a map indicating the sales position.

With these hardcopy items, the customer can immediately find the objective sales position for the purchase of the desired article. Namely, this system is also effective as a sales floor guide system.

FIG. 24 is a diagram for explaining a method of creating contents of the coordinate data base 1723.

Knowledge items of coordinates obtained from experienced salespersons or sales experts are supplied from a registration terminal 2401 to a knowledge processing section 2402 in an interactive fashion. The knowledge processing section 2402 appropriately processes the received knowledge items to register the resultant items in the coordinate data base 1723.

Data accumulated in the article selection history control file 172 are subjected to a summation process to obtain customers' needs analysis data. For example, based on a statistical result of attribute data with respect to "color", colors included in the 59% of most-frequently selected colors are assumed to be "prevailing or dominant colors", which would possibly be used when purchasing goods and when making a sales target strategy for customers.

Furthermore, the present invention may also be applicable to other embodiments. For example, the present invention can be applied to a case handling a group of articles and goods such as furniture and audio appliances in which experts' knowledge is required when combining various constituent components.

In accordance with the present invention, the merchandise codes are read in a predetermined sequence such that, based on the information items thus obtained in the predetermined order, a computer system produces article display position data. Consequently, the article display positional information in a store can be collected by use of simple means, which results in an advantage that an appropriate method of controlling the article display is implemented.

Moreover, in accordance with the present invention, based on a key article, coordinate items to be desired by the customer for the key article can be appropriately presented so as to motivate the customer to purchase the article and items. This will consequently increase the number of articles and items to be purchased by the customer for each visit to the store, which in turn promotes the sales activities on the store side.

In addition, the information items of customers' needs can be collected for analyses from article selection information supplied from the customers, which advantageously helps plan a sales strategy.

We claim:

1. A method of controlling articles displayed for sale comprising the steps of:
    reading in a predetermined order merchandise codes of the displayed articles by use of a code reader;
    obtaining sales display position data of the articles depending on a series of the merchandise codes read in the predetermined order;
    selecting an article from the displayed articles;
    accessing a data base storing therein information of the displayed articles to retrieve at least one coordinate article, from the stored information, to be combined with the selected article; and
    outputting information about the retrieved coordinate article.

2. A method of determining sales display inventory of articles displayed for sale, comprising the steps of:
    reading merchandise codes of the displayed articles in a predetermined order along a desired path previously determined by connecting locations of display of said displayed articles;
    obtaining sales display position data of the articles depending on a series of the merchandise codes read in the predetermined order;
    outputting information of the displayed articles based on the sales display position data of the articles; and
    determining sales display inventory of the displayed articles from the outputted information of the displayed articles.

3. A method according to claim 2, wherein said step of outputting the information of the articles includes the steps of:
    judging to determine whether or not the article sales display position data represent predetermined sales display positions;
    detecting, when the predetermined sales display positions are not represented, an article not associated with the predetermined sales display positions; and
    outputting the displayed article information to identify the detected article.

4. A method according to claim 2, further comprising:
    a step of beforehand displaying, on a screen display, image information of a state in which the articles are displayed for sale in predetermined sales display positions, wherein
    said step of outputting the information of the articles includes the steps of:
    processing the article sales display position data and the image information to generate image information of a state in which the articles are displayed for sale; and
    outputting the generated image information.

5. A method according to claim 4, wherein the image information of the state in which the articles are displayed for sale in the predetermined sales display positions includes information about at least one of a color, a texture, and a pattern of the articles.

6. A method according to claim 5, wherein the image information of the state in which the articles are displayed for sale in the predetermined sales display positions is generated by combining information items respectively of a color, a texture, and a pattern of the articles with each other.

7. A method according to claim 2, further including the steps of:
    inputting sales data of the articles; and
    outputting the inputted sales data of the articles depending on the article sales display position data.

8. A method according to claim 2, further comprising the steps of:
    storing the series of merchandise codes and article sales display position data in a storage;
    re-reading the merchandise codes of the displayed articles after a predetermined time period following the reading step;
    inputting sales data regarding the articles during the predetermined time period;
    determining as lost articles those articles that are not found in either the sales data or in the merchandise codes reread during the re-reading step, from among the series of merchandise codes stored in said storage; and
    outputting the lost articles thus determined based on the display position data of the articles.

9. A method according to claim 2, wherein said output of the information is performed while the merchandise codes of the displayed articles are being read.

10. A method of determining sales display of articles displayed for sale, comprising the steps of:
    reading merchandise codes of the displayed articles and fixture codes attached onto article sales display fixtures on which the articles are displayed for sale in a predetermined order along a desired path previously determined by connecting locations of display of said displayed articles and locations of the fixture codes;
    obtaining sales display position data of the articles depending on a series of merchandise and fixture codes thus read in the predetermined order; and
    outputting article information of the displayed articles, based on the article sales display position data, for determining sales display of the displayed articles.

11. A method according to claim 10, further including the steps of:
    disposing beforehand data of the article sales display fixtures with respect to positions thereof on a floor of a store and the fixture codes with a correspondence established therebetween; and
    representing the article sales display position data by use of the data of the positions on the floor.

12. An article guide method, comprising the steps of:
    inputting data related to a plurality of attributes of an article in a single input operation;
    accessing an article data base storing therein respective codes of a plurality of articles, data related to respective attributes of the plurality of articles, and data representing a relationship between the attributes of the plurality of articles with correspondencies established therebetween to retrieve an article having the inputted attributes;
    thereafter retrieving, based on all of the data related to the relationship between the retrieved article and other articles, another article; and
    outputting the retrieved article and the another article with a correspondence established therebetween;

wherein the article data base contains respective article sales display positions in association with the plurality of articles; and said output of the retrieved article and the another article is determined based on the sales display positions of the respective articles.

13. A system for analyzing inventory of articles displayed for sale, comprising:
- an input device for reading merchandise codes of the displayed articles;
- means for obtaining sales display position data of the articles depending on a series of the merchandise codes inputted from said input device in a predetermined order;
- means for selecting an article from the displayed articles;
- a data base storing therein information of the displayed articles;
- means for retrieving from said data base information representing at least one coordinate article, from the stored information, to be combined with the selected article; and
- an output device for outputting inventory information about the retrieved coordinate article information reflecting the sales display position data of the articles.

14. A system for determining sales display inventory of articles displayed for sale, comprising:
- a code reader for reading merchandise codes of the displayed articles;
- means for obtaining sales display position data of the articles depending on a series of the merchandise codes read by said code reader in a predetermined order along a desired path previously determined by connecting locations of display of said displayed articles; and
- an output device for outputting inventory information of the displayed articles based on the article sales display position data.

15. A system according to claim 14, further comprising:
- a storage for storing therein image information of a state in which the articles are displayed in predetermined display positions on a screen display;
- said output device generating, based on the article display position data and the image information stored in said storage, image information of a state in which the articles are displayed, thereby outputting the generated image information.

16. A system according to claim 14, further comprising:
- an input device for inputting sales data of the articles,
- said output device outputting sales data of the inputted article depending on the article sales display position data.

17. (Amended) A system according to claim 14, wherein said output device includes means for outputting the information of the articles responsive to the code reader reading the merchandise codes while the code reader is reading the merchandise codes.

18. A system for determining sales display of articles displayed for sale, comprising:
- a code reader for reading merchandise codes of the displayed articles and fixture codes attached onto the article sales display fixtures on which the articles are displayed for sale;
- means for obtaining sales display position data of the articles depending on the merchandise codes and the fixture codes thus read in a predetermined order by said code reader along a desired path previously determined by connecting locations of display of said displayed articles and locations of the fixture codes; and
- an output device for outputting information of the displayed articles based on the article sales display position data.

19. A system according to claim 18, further comprising:
- a storage for storing therein data of the article sales display fixtures with respect to positions on a floor of a store and the fixture codes with a correspondence established therebetween,
- said output device outputting the article sales display position data depending on the data of the fixtures on the floor of the store.

20. An article guide system, comprising:
- an input device for inputting data related to a plurality of attributes of an article;
- an article data base for storing therein codes of a plurality of articles, data related to respective attributes of the plurality of article, and data representing a relationship between the attributes of the plurality of articles with correspondencies established therebetween;
- means for retrieving from said article data base information representing an article having attributes inputted from said input device;
- means for retrieving information representing another article from said article data base depending on the relationship between all of the attributes of the retrieved article and the another article; and
- an output device for outputting the information representing the retrieved article and the another article with a correspondence established therebetween;
- wherein said article data base further includes sales display positions of the article in association with the another article; and
- said output device outputs, by referencing the article data base, the retrieved article and the another article in association with the respective article sales display positions.

* * * * *